United States Patent Office 2,822,663
Patented Feb. 11, 1958

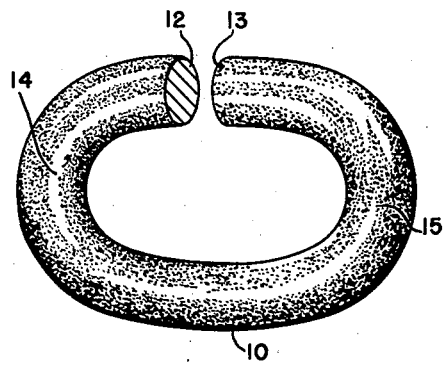
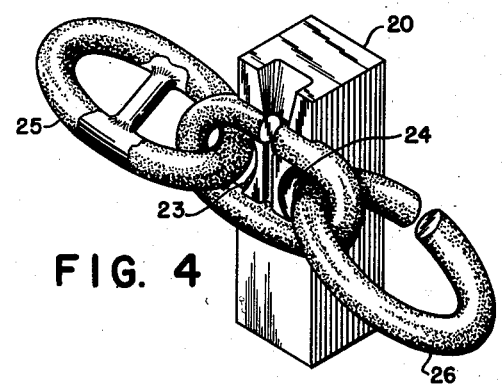
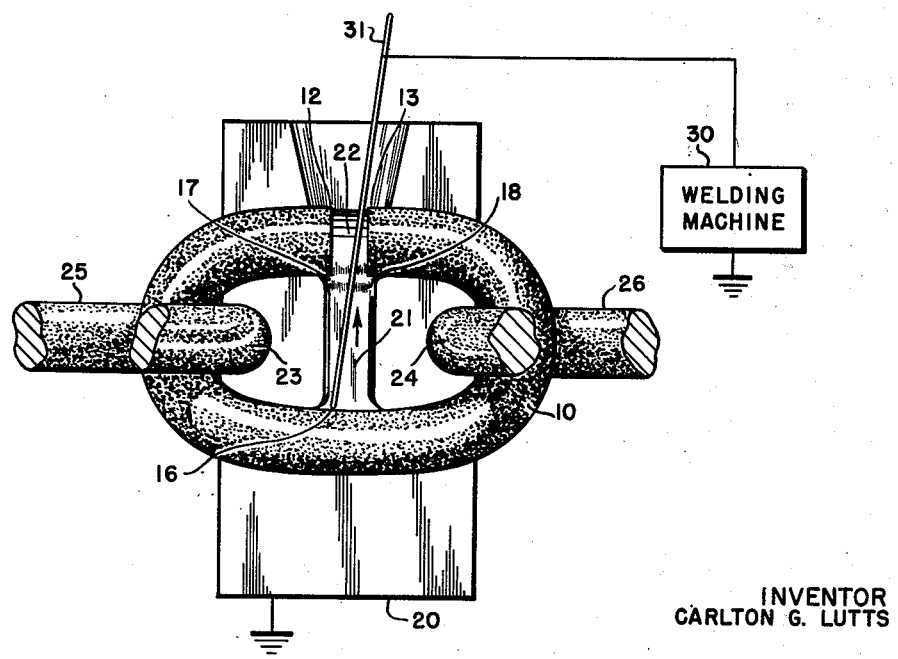

2,822,663

ANCHOR CHAIN STUD LINK WITH CROSS MADE ENTIRELY OF WELD METAL

Carlton G. Lutts, Salem, Mass.

Application April 24, 1952, Serial No. 284,193

2 Claims. (Cl. 59—90)

(Granted under Title 35, U. S. Code (1952), sec. 266)

The invention described herein may be manufactured and used by or for the Government of the United States of America for governmental purposes without the payment of royalty thereon or therefor.

This invention relates to wrought metal chain links of the stud type such as are used in chains for mooring ships and buoys and the like, and more particularly to an improved method of manufacture of such links.

Heretofore, several methods for making chain stud links of this class have been employed with varying degrees of advantage and success. Of the prior art methods, a first consists of making the links from bar wrought iron fire welded by hand or by power and fitted with drop forged or cast studs. A second method involves the casting of the links from molten steel poured into sand molds. A third method involves the forging of links under heavy drop hammers, generally known as the "Die-lock" process. Still another method involves the forming of two U-shaped pieces which are then joined together by an electric butt weld. A fifth method, which is somewhat related to the herein disclosed method, consists in bending pieces of bar stock of a desired length into a link shape, and closing the opening remaining between the ends of the bar by a suitable welding process. The cross bar or stud is separately made from a piece sheared or saw cut from rolled bar stock and inserted crosswise in the link. With the preformed stud in position, one end rests on the side of the link opposite the aforementioned opening, and the other end approaches the base of said opening. With the stud held in position in a suitable jig or mold, a weld is commenced at the last-mentioned end of the stud, and the stud and the mutually directed ends of the link joined together by a continuous welding process. Thereafter, in an independent operation, a fillet weld deposit is made around the other end of the stud at the junction thereof with the other side of the link.

Links made in accordance with the method just described have the advantage of comparatively low cost since they are bent from bar stock with relatively little waste as compared with forging or casting methods, the number of manufacturing steps are comparatively few, and a minimum of heavy machinery is required to carry out the method. However, this type of link has certain disadvantages and weaknesses stemming from the use of the separately manufactured stud. The stud itself is a comparatively costly item because of the various manufacturing steps required in their production, namely, cutting the pieces from rolled bar stock, handling the pieces and finally setting them in position preparatory to the welding operation. Apart from the cost of manufacture, this type of stud fits loosely in the link giving the appearance of poor workmanship. Since the stud pieces are sawed or sheared from bar stock, they necessarily have flat ends and accordingly do not conform to the rounded contour of the bar stock of the link, resulting in a poor fit and openness of joint. The application of fillet weld metal around the end of the stud improves the appearance of the joint and also adds some strength, but the cost of this additional operation outweighs the improvement in appearance. Moreover, the attachment of the stud by fillet welding is relatively weak and the stud may be loosened or bent by the heavy blows to which anchor chain links are subjected in service. The quality and strength of the closure weld is also affected adversely by the use of the separate stud owing to the fact that the closure weld is necessarily started on the end of the cold stud. It is generally recognized in the welding art that the first few beads deposited by electric arc welding are of inferior quality, and that if the stock being welded is cold, this defect is aggravated. Both of these conditions exist in this prior art method since the weld deposit is started on the top of the cold stud adjacent the mutually directed ends of the link which are also in a cold condition. This results in an inferior weld in the region of the intersection of the stud with the side wire of the link, a condition which is particularly disadvantageous since the tensile stresses in the link when placed under load are highest in this region.

An object of the present invention is to overcome the disadvantages of the above-described method of making chain links of the stud type.

A further object of the invention is to provide a method of welding chain links which will assure optimum welding conditions thereby to provide a strong and reliable link.

Another object of the present invention is to make a superior yet more economical stud link.

In carrying out the objects of the invention, the foregoing disadvantages of the prior art method are overcome while still retaining the advantage of economy and low cost afforded by fabrication of the link from bar stock. Further economy is realized by eliminating the separately manufactured stud and forming the stud integrally with the link. Essentially, the invention consists of bending bar stock to a link shape and forming the stud integrally with the link at the same time the opening in the side of the link is welded and from the same weld material. The stud is made by commencing an electric arc deposit on the inside of the link directly opposite the link opening and building up the stud by weld metal deposition in the direction of the opening. After the stud is formed, the welding operation is continued without interruption to close the link opening whereby making one end of the stud integral with the closure weld of the link, with the other end of the stud also welded integrally with the link at the point of commencement.

Other objects and many of the attendant advantages of this invention will be readily appreciated as the same becomes better understood by reference to the following detailed description when considered in connection with the accompanying drawings wherein:

Fig. 1 illustrates a piece of bar stock from which the link is formed;

Fig. 2 is a side view of the bar stock bent to link shape;

Fig. 3 is a cross-sectional view of suitable apparatus for carrying out the welding process;

Fig. 4 is an isometric view of half of the mold of Fig. 3 illustrating more clearly the configuration of the mold cavities;

Figure 5:
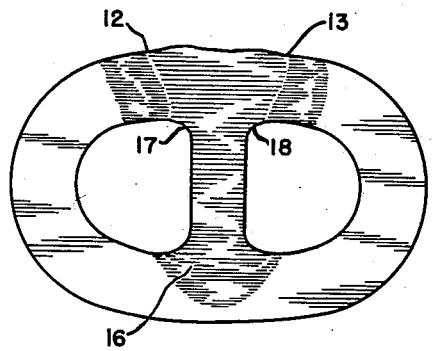
Fig. 5 is a cross-sectional view through the horizontal axes of the link illustrating the acid etched appearance of the metal of the stud and link.

In accordance with the invention, chain links are fabricated from rolled bar stock, the fibers of which are aligned longitudinally with the length of the bar for maximum tensile strength, and accordingly a desirable and economical form of stock for chain manufacture. The first step in the manufacture of the chain consists in cutting the cylindrical rolled bar stock into suitable lengths for the size of the link to be made, one such length being shown at 10 in Fig. 1. The section of bar stock 10 is then heated and bent by suitable apparatus into the chain link shape indicated in Fig. 2. The bends are made in the bar stock in such locations as to leave an opening between the mutually directed ends 12 and 13 of the stock of a width approximately equal to one wire diameter thereby to permit the threading of an adjacent link prior to welding. As illustrated, the opening is formed in one side of the link substantially equidistant from the ends of the link. The link 10 of Fig. 2 is formed in one plane and no operation of twisting the two ends together or other manipulation is required for threading successive links together. During the bending operation the fiber orientation in the region of the bend, namely, at 14 and 15, follows the curvature of the stock thereby maintaining a condition of maximum tensile strength at these points.

After threading the link of Fig. 2 with a previously formed link of a chain, it is then ready for the next and principal step in the present manufacturing method, namely, the forming of the complete stud and closure weld in a single operation. This step is preferably carried out in a metal mold 20, a suitable form being shown in Figs. 3 and 4, in which the link 10 is held in a vertical position as shown. The mold is sufficiently large to enclose a large portion of the link, particularly the area thereof in which the stud is formed. Preferably the mold comprises two separable blocks, each of which is formed to conform to the contour of the bar stock of the link and having a cavity extending between the two sides of the link of a shape corresponding to the desired shape of the stud. In the drawing, numeral 21 represents the stud cavity and the region 22 represents the cavity for containing and forming the closure weld. The link to be welded is maintained in a vertical position, the mold being provided with cut-outs 23 and 24 for receiving and positioning links 25 and 26, respectively, in a horizontal position, to thereby avoid interference from adjacent links during the welding process. The stud and closure are made by electric arc welding and may be carried out by either hand or machine methods depending upon the wire size of the links. Whichever apparatus is used, the essential apparatus comprises a welding machine diagrammatically illustrated at 30 suitably connected to welding rod 31. The welding operation is commenced by striking an arc between the welding rod and the link at point 16 where a sound, complete weld jucture is made to the solid side of the link. The continuation of the electric current with the proper manipulation of the welding rod within the cavity 21 causes the stud deposit to grow in the direction indicated by the arrow until at point 17 it contacts the lower corners of the mutually directed ends 12 and 13 of the link. Ends 12 and 13 have by this time been well preheated by the radiation of heat from the electric weld formation of the stud, and this advantage combined with the fact that no interruption of the welding process takes place, gives a closure weld between points 12 and 13 of reliability and strength. The welding operation is terminated when the cavity 22 is filled to a point where the upper surface of the weld metal conforms to the upper surface of the link.

If proper welding rod is used, and the mold accurately formed to a size slightly larger than the desired finished size, chain links can be formed by the foregoing method which have a smooth and finished appearance and suitable for use without further processing. Commercial brands of welding rod, having a suitable flux thereon to produce a smooth weld are available, a suitable one being AW2B.

Alternatively, a somewhat less accurate mold may be utilized and a weld deposit made which is slightly protuberant in the region of the closure. If this method is employed, an added operation of hot pressing is necessary to remove the excess in the form of flash which is thereafter trimmed away by power press trimming dies. To accomplish hot pressing, the whole chain or groups of links are heated to a dull red temperature to soften the metal thereby making it easy to push out the surplus metal in the form of flash. This operation promotes smoothness of the finished link and a good appearance in the area of the weld metal and may also refine the grain of the weld deposit.

Whichever of the two alternative methods just described are used, a link is formed in which the stud and closure are intimately joined to the remainder of the link. The fusion of metal obtained by the present method is illustrated in Fig. 5 which represents a link sectioned in the horizontal plane and acid etched for development of interior metal structure. At point 16, where the weld was commenced, the acid etch discloses a complete fusion weld with the side of the link with every evidence of reliability and strength. Also, at the ends 12 and 13 of the bar stock, the original stock is melted back some distance and the metal thereof intimately mixed with the new welding metal. In addition, at the critically stressed points 17 and 18 the weld is sound and satisfactory.

Figure 6:
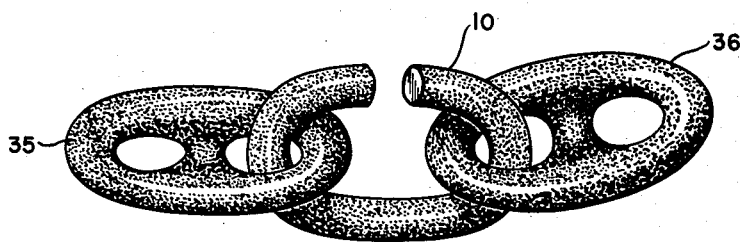
Fig. 6 is an elevation view of a three-link section comprising two preforged links joined by a third link prior to welding by the present method.

For many years manufacturers of anchor chain have, when design conditions permitted, had recourse to a means of lowering the cost of the product by employing alternate preforged or precast links which made it necessary only to form a closure in every other link. Some chain designs do not permit this saving, but in the case of the present invention the design permits taking advantage of this economy measure and alternate preforged links may be used. Fig. 6 discloses the manufacture of such a chain in which the present invention may be employed wherein links 35 and 36 represent two preforged links and link 10 represents a joining link ready to be welded in accordance with the present invention.

Figure 7:
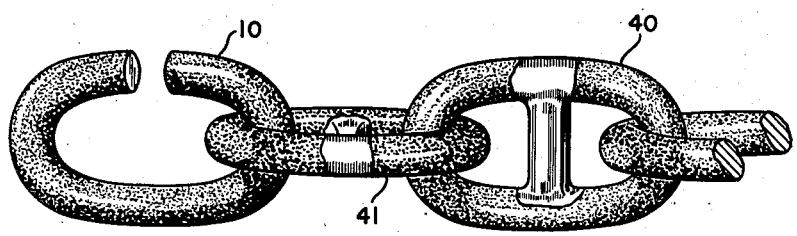
Fig. 7 is an elevation view of a triplet comprising two links manufactured in accordance with the present invention and a third link in condition for welding.

If heavy forge equipment is not available for making the alternate preforged links, or it is undesirable for some reason to make the chain from alternate solid and welded links by the method just described, the chain may be made completely of links each prepared and welded in accordance with the teachings of the present invention. Fig. 7 illustrates such a chain in which links 40 and 41 are two successive links already welded, and 10 represents a third link threaded to link 41 preparatory to welding.

In summary, the present invention provides several advantages over chains constructed in accordance with prior art methods. The cost of manufacture is lower because a single welding operation is used to complete the entire stud and closure. The stud and closure weld is integral and therefore of the strongest possible design. Since the electric arc welding deposit is commenced at the solid side of the link making a complete cross-sectional fusion weld therewith, the appearance of the stud at its base, as well the the appearance of the closure weld, is smooth and suggests good workmanship. Finally, the closure weld has good reliability and strength because the bar ends to be weld together are preheated by the heat radiating from the growing stud deposit, and because the closure weld is a continuation of the stud weld without any weakness arising from interruption of the welding or from cold starts.

Obviously many modifications and variations of the present invention are possible in the light of the above teachings. It is therefore to be understood that within the scope of the appended claims the invention may be practiced otherwise than as specifically described.

Having fully described my invention what I claim and desire to secure by Letters Patent is:

1. A chain link comprising a section of bar stock having opposite ends bent back toward and in substantial alignment with each other, said ends being homogeneously united by a molded deposit of non-parent weld metal provided therebetween and corresponding in cross section substantially to the cross section of said bar, said molded deposit being extended to bridge completely the space between said ends and the opposite side of said link to form a stud section, said stud section consisting exclusively of said molded deposit, said molded deposit being of uniform chemical and physical characteristics throughout, said stud section throughout its entire transverse end area being fused homogeneously with and united to said opposite side of said link, said opposite side of said link being homogeneously united by said molded deposit of weld metal including said stud section to both of said first-mentioned ends.

2. The method of making a chain link which comprises doubling back the ends of a bar section toward each other, said ends being spaced apart a distance at least equal to the diameter of said bar section, providing a mold with a first part around the end portions of said bar closely fitting thereabout and forming a pocket open at the top and extending between said bar section ends, said mold providing a second part bridging completely to the opposite side of the link and extending the pocket to said opposite side of the link, introducing a quantity of non-parent weld metal into said pocket and thereupon melting said weld metal progressively from said opposite side of the link to said bar ends for fusing with and homogeneously uniting said opposite side of the link and said bar ends, whereby there is formed a stud section consisting exclusively of said weld metal and being of uniform chemical and physical characteristics throughout, and whereby said stud section thus formed is throughout its entire transverse end area fused homogeneously with and united to said opposite side of said link, and subsequently removing said mold.

References Cited in the file of this patent

UNITED STATES PATENTS

| | | |
|---|---|---|
| 206,335 | Kampf | July 23, 1878 |
| 1,370,926 | Stahl | Mar. 8, 1921 |
| 1,598,680 | Grace | Sept. 7, 1926 |
| 1,938,056 | Taylor | Dec. 5, 1933 |
| 2,288,494 | Speed et al. | June 30, 1942 |
| 2,348,087 | Miller | May 2, 1944 |
| 2,439,522 | Miller | Apr. 13, 1948 |
| 2,451,253 | St. Pierre | Oct. 12, 1948 |

FOREIGN PATENTS

| | | |
|---|---|---|
| 610,523 | Great Britain | Oct. 18, 1948 |